US011158036B2

(12) United States Patent
Walls et al.

(10) Patent No.: US 11,158,036 B2
(45) Date of Patent: Oct. 26, 2021

(54) METHODS, DEVICES, AND COMPUTER PROGRAM PRODUCTS FOR CHECKING ENVIRONMENT ACCEPTABILITY FOR 3D SCANNING

(71) Applicant: Sony Group Corporation, Tokyo (JP)

(72) Inventors: Mattias Walls, Häljarp (SE); Francesco Michielin, Stuttgart (DE); Daniel Linåker, Lund (SE); Bo-Erik Månsson, Bjärred (SE); Henrik Tuszynski, Lomma (SE); Johannes Elg, Helsingborg (SE); Henrik Vallgren, Furulund (SE); Fredrik Mattisson, Lund (SE); Fredrik Olofsson, Lund (SE); Lars Novak, Bjärred (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/642,070

(22) PCT Filed: Aug. 31, 2017

(86) PCT No.: PCT/US2017/049603
§ 371 (c)(1),
(2) Date: Feb. 26, 2020

(87) PCT Pub. No.: WO2019/045727
PCT Pub. Date: Mar. 7, 2019

(65) Prior Publication Data
US 2020/0286217 A1 Sep. 10, 2020

(51) Int. Cl.
*G06K 9/00* (2006.01)
*G06T 7/00* (2017.01)

(52) U.S. Cl.
CPC .. *G06T 7/0002* (2013.01); *G06T 2207/30168* (2013.01); *G06T 2207/30201* (2013.01)

(58) Field of Classification Search
CPC ......... G06T 7/0002; G06T 2207/30168; G06T 2207/30201
(Continued)

(56) References Cited

U.S. PATENT DOCUMENTS 8,401,225 B2* 3/2013 Newcombe ............. G06T 7/194
382/100
9,377,310 B2* 6/2016 Stipes .................. G01C 21/206
(Continued)

FOREIGN PATENT DOCUMENTS

WO 2011/002505 1/2011

OTHER PUBLICATIONS

Weise, Thibaut, et al. "In-hand scanning with online loop closure." 2009 IEEE 12th International Conference on Computer Vision Workshops, ICCV Workshops. IEEE, 2009. (Year: 2009).*
(Continued)

*Primary Examiner* — Jonathan S Lee
(74) *Attorney, Agent, or Firm* — Myers Bigel P.A.

(57) ABSTRACT

Methods of determining whether an environment is suitable or acceptable for performing a three-dimensional (3D) scan are provided. The methods may include performing one or more checks on captured image data of the environment, wherein performing each of the one or more checks comprises determining whether the environment satisfies a respective criterion. The method may further include determining that the environment is suitable or unsuitable for performing the 3D scan based on a result of each performed check. Determining that the environment is suitable for performing the 3D scan may include determining that the environment satisfies each of the respective criteria of the performed one or more checks. Determining that the environment is unsuitable for performing the 3D scan may include determining that the environment does not satisfy at
(Continued)

least one criterion of the performed one or more checks. Related devices and computer program products are also provided.

17 Claims, 8 Drawing Sheets

(58) Field of Classification Search
USPC .......................................................... 382/100
See application file for complete search history.

(56) References Cited

U.S. PATENT DOCUMENTS

| | | | |
|---|---|---|---|
| 10,636,114 B2* | 4/2020 | Qi | ............................. G06T 7/44 |
| 10,915,731 B2* | 2/2021 | Mccormac | ........... G06K 9/6257 |
| 2005/0281549 A1 | 12/2005 | Shih et al. | |

OTHER PUBLICATIONS

Kin Leong Ho et al., "Loop Closure Detection in SLAM by Combining Visual and Spatial Appearance," Robotics and Autonomous Systems 54 (2006) 740-749, www.sciencedirect.com.

Longyu Zhang et al., "From 3D Sensing to Printing: A Survey," ACM Trans. Multimedia Comput. Commun. App., vol. 12, No. 2, Article 27, Oct. 2015.

Longyu Zhang et al., "Development of an Automatic 3D Human Head Scanning-Printing System," Springer Multimed Tools App., (2017) 76:4381-4401.

Notification of Transmittal of the International Search Report and the Written Opinion of the International Searching Authority, corresponding to International Application No. PCT/US2017/049603, dated Oct. 23, 2017.

* cited by examiner

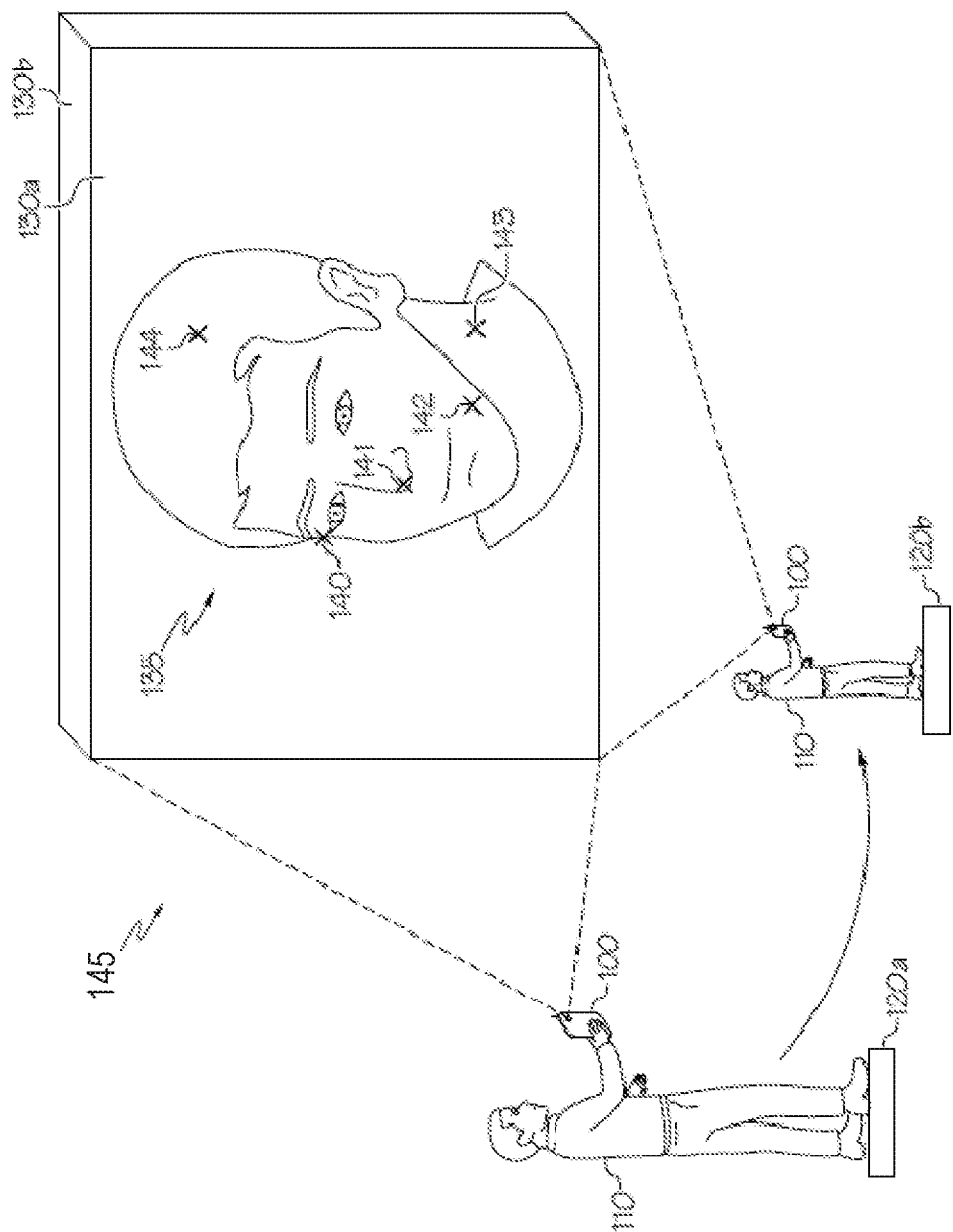

METHODS, DEVICES, AND COMPUTER PROGRAM PRODUCTS FOR CHECKING ENVIRONMENT ACCEPTABILITY FOR 3D SCANNING

CROSS REFERENCE TO RELATED APPLICATION

This application is a 35 U.S.C. § 371 national stage application of PCT International Application No. PCT/US2017/049603, filed on Aug. 31, 2017, the content of which is incorporated herein by reference in its entirety. The above-referenced PCT International Application was published in the English language as International Publication No. WO 2019/045727 A1 on Mar. 7, 2019.

FIELD

The present disclosure relates to image processing, and more particularly, to methods and devices for three-dimensional (3D) modeling.

BACKGROUND

Three-dimensional (3D) modeling may be used to create a representation of an object for use in a variety of applications, such as augmented reality, 3D printing, 3D model development, and so on. A 3D model may be defined by a collection of points in 3D space connected by various geometric entities such as triangles, lines, curved surfaces, or the like.

One potential way to generate a 3D model of an object is via 3D scanning of the object. Although there are various methods to perform 3D scanning, one area of potential growth and development includes capturing a set of images by an image capture device. A collection of points in 3D space may be determined from corresponding feature points in the set of images. A mesh representation (e.g., a collection of vertices, edges, and faces representing a "net" of inter-connected primitive shapes, such as triangles) that defines the shape of the object in three dimensions may be generated from the collection of points. Refinements to the mesh representation may be performed to further define details, and the resulting mesh may be textured to apply color and shading. This process may result in a 3D model.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of present inventive concepts.

The inventors of the present application have recognized that the physical environment in which a 3D scan of an object (e.g., in which the set of images are captured) is an important aspect in determining the success and/or quality of the 3D model that results from the processing of the set of images. For example, a 3D scan conducted in an inappropriately-lit environment (e.g., too much light, not enough light, and/or inconsistent light) may be less successful in capturing data or details of the object than a 3D scan conducted in an appropriately-lit environment.

3D scanning is a computationally intensive endeavor, and efficiencies may be realized by performing a 3D scanning process more frequently where an environment in which the scan is to occur is suitable or acceptable, and less frequently where an environment is which the scan is to occur is unsuitable or unacceptable. Satisfaction in the 3D scanning equipment and/or 3D scanning process will also be increased with a greater ratio of suitable environment scans relative to unsuitable environment scans. Frequently, the environment variables that partially determine whether an acceptable 3D scan is possible are controllable by a user. For example, an amount of light in the environment is often adjustable, and an amount of light may be increased (e.g., by turning on a lamp or overhead lighting device) or decreased (e.g., by closing a window shade or curtain).

Therefore, to address these and other technical problems, the present disclosure provides devices, computer program products, and methods for checking whether an environment in which a 3D scan is to be performed is an acceptable environment. For example, the methods provided herein include a method of determining whether an environment is acceptable for performing a three-dimensional (3D) scan. The method may include performing one or more checks on captured image data of the environment. Performing each of the one or more checks on captured image data of the environment may include determining whether a condition exists in the environment satisfies a respective criteria that renders the environment unsuitable for performing the 3D scan. The method may further include determining that the environment is suitable or unsuitable for performing the 3D scan based on a result of each performed check. Determining that the environment is suitable for performing the 3D scan comprises determining that the environment satisfies each of the respective criteria of the performed one or more checks, and determining that the environment is unsuitable for performing the 3D scan comprises determining that the environment does not satisfy at least one criterion of the performed one or more checks.

In some embodiments, the method may also include that a first check of the one or more checks comprises comparing a first light level of the captured image data and a first threshold. In some embodiments, the method may also include that a second check of the one or more checks comprises comparing of a second light level the captured image data and a second threshold. In some embodiments, the method may also include that a third check of the one or more checks comprises comparing a third threshold and a difference between a first light level of the captured image data and a second light level of the captured image data. In some embodiments, the method may also include that a fourth check of the one or more checks comprises performing a loop closure check. In some embodiments, the method may also include that a fifth check of the one or more checks comprises performing a background check. Performing a background check may include determining a plurality of feature points in the captured image data, distributing the plurality of feature points into one or more sectors, and determining whether the number of feature points for each sector of the one or more sectors exceeds a threshold value.

Optionally, methods disclosed herein may include receiving in a storage medium the captured image data from an image capture device. Methods disclosed herein may include determining that each performed check indicates that the environment is suitable for performing the 3D scan, and instantiating performance of a 3D scanning process. Additionally/or alternatively, methods disclosed herein may include determining that at least one performed check indicates that the environment is unsuitable for performing the 3D scan, and indicating to a user that the environment is unsuitable for performance of the 3D scan. In some embodiments, the methods may further include receiving a user command indicating acknowledgement of the indication that the environment is unsuitable for performance and commanding instantiation of the 3D scanning process.

Also provided herein are devices and computer program products. For example, provided herein include an electronic device that may include a processor and a storage device that is coupled to the processor and comprising computer readable program code therein that when executed by the processor causes the processor to perform any of the method discussed above. Separately, provided herein are computer program products comprising a non-transitory computer readable storage medium comprising computer readable program code therein that when executed by a processor causes the processor to perform any of the method discussed above.

Furthermore, provided herein are computer program products comprising a non-transitory computer readable storage medium comprising computer readable program code therein that when executed by a processor causes the processor to perform operations comprising performing one or more checks on captured image data of the environment. Performing each of the one or more checks on captured image data of the environment may include determining whether a condition exists in the environment satisfies a respective criteria that renders the environment unsuitable for performing the 3D scan. The method may further include determining that the environment is suitable or unsuitable for performing the 3D scan based on a result of each performed check. Determining that the environment is suitable for performing the 3D scan comprises determining that the environment satisfies each of the respective criteria of the performed one or more checks, and wherein determining that the environment is unsuitable for performing the 3D scan comprises determining that the environment does not satisfy at least one criterion of the performed one or more checks.

In some embodiments the computer readable program code that causes the processor to perform the one or more checks comprises computer readable program code that causes the processor to perform at least one of: a comparison of a first light level of the captured image data and a first threshold; a comparison of a second light level the captured image data and a second threshold; and/or a comparison of a third threshold and a difference between a first light level of the captured image data and a second light level of the captured image data.

In some embodiments the computer readable program code that causes the processor to perform the one or more checks comprises computer readable program code that causes the processor to perform a loop closure check.

In some embodiments the computer readable program code that causes the processor to perform the one or more checks comprises computer readable program code that causes the processor to perform a background detail check.

Provided herein are electronic devices, including an electronic device comprising a processor and a storage device that is coupled to the processor and comprising computer readable program code therein that when executed by the processor causes the processor to perform operations comprising performing one or more checks on captured image data of the environment. Performing each of the one or more checks on captured image data of the environment may include determining whether a condition exists in the environment satisfies a respective criteria that renders the environment unsuitable for performing the 3D scan. The method may further include determining that the environment is suitable or unsuitable for performing the 3D scan based on a result of each performed check. Determining that the environment is suitable for performing the 3D scan comprises determining that the environment satisfies each of the respective criteria of the performed one or more checks, and wherein determining that the environment is unsuitable for performing the 3D scan comprises determining that the environment does not satisfy at least one criterion of the performed one or more checks.

In some embodiments, the electronic device may include computer readable program code that causes the processor to perform at least one of a comparison of a first light level of the captured image data and a first threshold; a comparison of a second light level the captured image data and a second threshold; and/or a comparison of a third threshold and a difference between a first light level of the captured image data and a second light level of the captured image data.

In some embodiments, the electronic device may include computer readable program code that causes the processor to perform a loop closure check.

In some embodiments, the electronic device may include computer readable program code that causes the processor to perform operations comprising determining a plurality of feature points in the captured image data, distributing the plurality of feature points into one or more sectors, and determining whether the number of feature points for each sector of the one or more sectors exceeds a threshold value.

BRIEF DESCRIPTION OF THE DRAWINGS

The accompanying drawings, which form a part of the specification, illustrate various embodiments of the present inventive concepts. The drawings and description together serve to fully explain embodiments of the present disclosure.

FIG. 1A is a diagram that illustrates a user capturing multiple images of an object with an electronic device, according to the present disclosure.

DETAILED DESCRIPTION

Figure 1B:
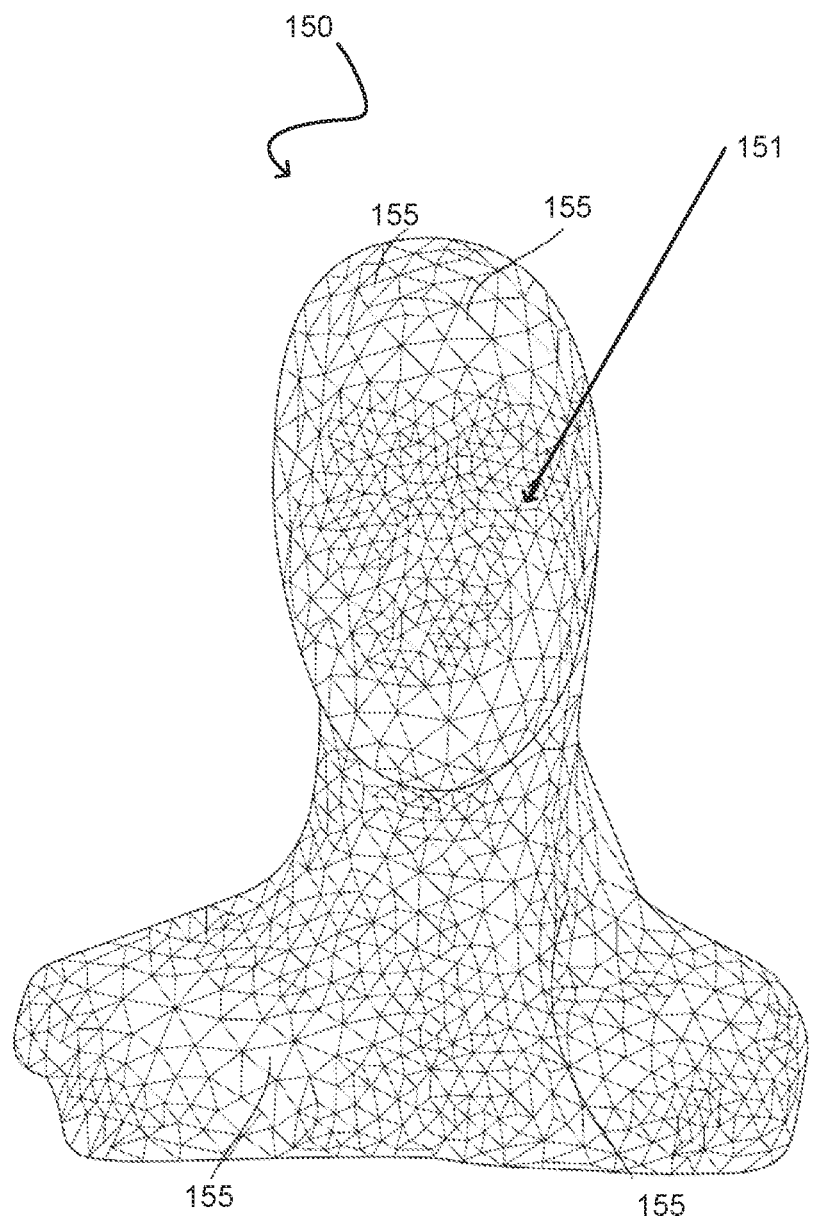
FIG. 1B is a diagram that illustrates a 3D model of an object, according to the present disclosure.

Three-dimensional (3D) scanning involves the capturing of data representative of a 3D object. In some situations, this data may be captured via an image capturing process, and an image or sequence of images may be processed to locate and determine a collection of points in 3D space. As discussed above, a mesh representation (e.g., a collection of vertices, edges, and faces representing a "net" of interconnected primitive shapes, such as triangles) that defines the shape of the object in three dimensions may be generated from the collection of points. This mesh representation is one component of a 3D model of the 3D object.

As part of context for the present application, FIG. 1A is a diagram that illustrates a user 110 capturing multiple images 130 of a physical object 135 with an electronic device 100, according to various embodiments of present inventive concepts. Although FIG. 1A illustrates an example in which the images 130 are captured by an image capture device 240 (FIG. 2A) at the electronic device 100, the images 130 may alternatively be captured by another device and subsequently received by the electronic device 100.

In FIG. 1A, the user 110 initiates a photographic session of the object 135, such as a head of a person or an automobile, at location 120a. The object 135 may be in an environment 145, which may be an interior room or an outdoor location. The user 110 may physically move in the environment 145 around the object 135 to various locations, such as from the location 120a to a different location 120b. An image 130 of the object 135 and of the environment 145 may be captured at each location. For example, image 130a is captured when the electronic device 100 is at the location 120a, and image 130b is captured when the electronic device 100 moves to the different location 120b. The captured images 130 may each be two-dimensional (2D) images, and may have a foreground part, which may largely include the object 135 and a background part which may largely include other objects or other components (e.g., walls and/or wall decorations, furniture, exterior walls, fences) in the environment 145.

The electronic device 100 may provide images 130 at various angles as the user 110 walks around the object 135. For example, the user 110 may capture images 130 around 360 degrees (or, alternatively, at least 180 degrees) of the object 135 and of the environment 145. After capturing at least two images 130, such as the images 130a and 130b, the images 130 may be processed by a processor 250 (FIG. 2A) in the electronic device 100, or by a processor external to the electronic device 100, to construct a preliminary digital 3D model 150 (FIG. 1B) of the physical object 135, or to otherwise generate a 3D image. The terms "construct" (or "constructing"), "generate" (or "generating"), and "build" (or "building") may be used interchangeably herein.

Processing of the images 130 may include identifying points 140-144 of the object 135 as captured in the images 130. The points 140-144 may include various edges, corners, or other points on a surface of the object 135. The points 140-144 may be recognizable locations on the physical object 135 that are tracked in various images 130 of the physical object 135. In some embodiments, constructing a preliminary 3D model 150 of the object 135 may involve capturing several (e.g., three, four, five, or more) images 130 of the object 135 and identifying tens, hundreds, or thousands of points 140-144. Locations (e.g., coordinates) of the points 140-144 may be estimated using various modeling/statistical techniques.

FIG. 1B is a diagram illustrating a 3D model 150 of an object 135, according to the present disclosure. Referring to FIG. 1B, a preliminary 3D model 150 of the object 135 may include an exterior surface 151 that includes a plurality of polygons 155. The plurality of polygons 155 may provide a representation of an exterior surface of the object 135. For example, the plurality of polygons 155 may model features, such as features at the points 140-144, on the exterior surface of the object 135. In some embodiments, the plurality of polygons 155 may include a plurality of triangles.

Figure 2A:
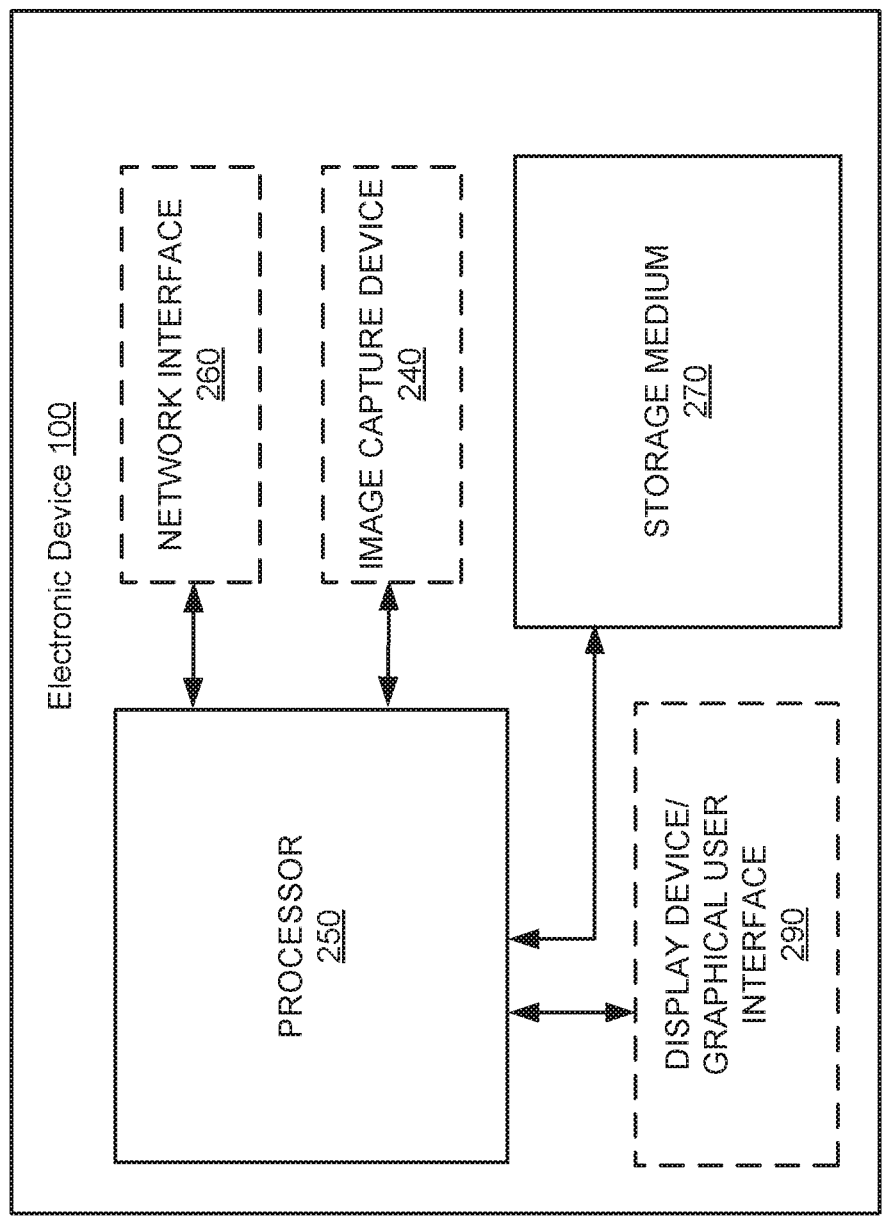
FIG. 2A is a block diagram of an electronic device of FIG. 1A, according to the present disclosure.

Referring now to FIG. 2A, a block diagram is provided of an electronic device 100 of FIG. 1A, according to the present disclosure. The electronic device 100 may include a processor 250 and a storage medium 270. Moreover, the electronic device 100 may, in some embodiments, include an image capture device 240, a network interface 260, and/or a Graphical User Interface (GUI) 290. The GUI 290 may include a display and/or a keypad or other interface that receives inputs from a user 110. In some embodiments, the GUI 290 may include a touchscreen. The image capture device 240 may be any camera or other device that captures image data of the object 135 and environment 145 that can be used to determine whether an environment is acceptable for performing a three-dimensional (3D) scan. The processor 250 may be coupled to the network interface 260. The processor 250 may be configured to communicate with a device that provides image data (such as another electronic device 100) via the network interface 260.

For example, the network interface 260 may include one or more wireless interfaces (e.g., 3G/LTE, other cellular, WiFi, other short-range, etc.) and one or more physical wired interfaces (e.g., Ethernet, serial, USB interfaces, etc.).

Referring still to FIG. 2A, the storage medium 270 may be coupled to the processor 250. The storage medium 270 may also store instructions/algorithms used by the processor 250. For example, the storage medium 270 of the electronic device 100 may include one or more algorithms that determine whether an environment 145 is acceptable for performing a three-dimensional (3D) scan.

The electronic device 100 may, in some embodiments, include the GUI 290. For example, a user 110 may use the GUI 290 at the electronic device 100 (i) to capture, or otherwise obtain, image data with respect to the object 135 and environment 145, (ii) to determine whether an environment 145 is acceptable for performing a three-dimensional (3D) scan, (iii) to receive an indication that the environment 145 is suitable or unsuitable for performing the 3D scan, (iv) to input a command to instantiate the 3D scanning process (even if the environment 145 is indicated to be unsuitable for performing the 3D scanning process), and/or (v) to provide additional input or data regarding the 3D scanning process.

Figure 2B:
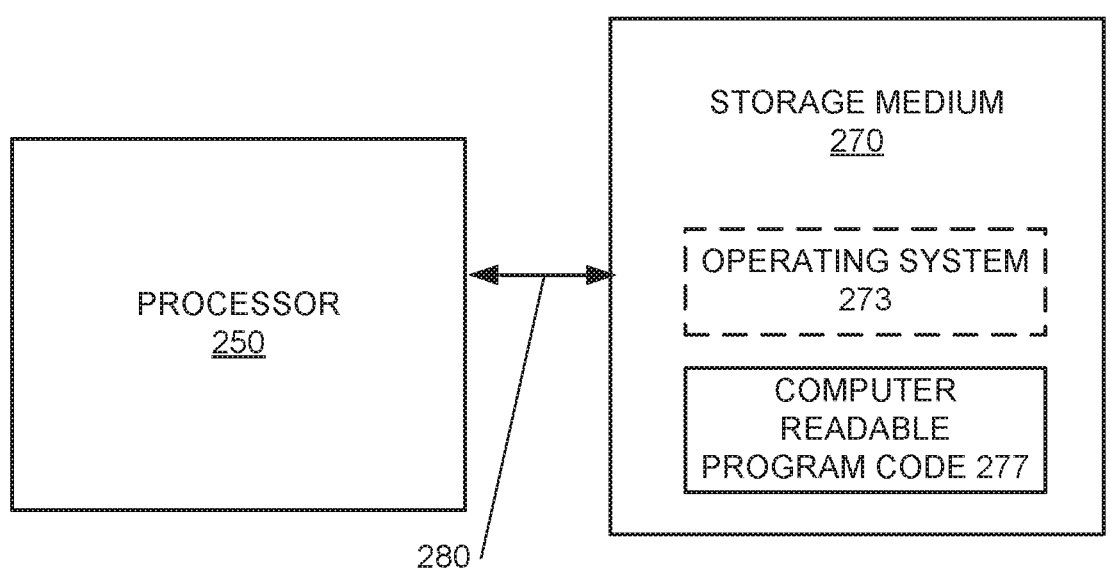
FIG. 2B is a block diagram that illustrates details of an example processor and memory that may be used in accordance with the present disclosure.

Referring now to FIG. 2B, a block diagram is provided that illustrates details of an example processor 250 and storage medium 270 of an electronic device 100 that may be used in accordance with various embodiments. The processor 250 communicates with the storage medium 270 via an address/data bus 280. The processor 250 may be, for example, a commercially available or custom microprocessor. Moreover, the processor 250 may include multiple processors. The storage medium 270 may be referred to herein as a "memory" and may be representative of the overall hierarchy of memory devices containing the software and data used to implement various functions of an electronic device 100 as described herein. The storage medium 370 may include, but is not limited to, the following types of devices: cache, ROM, PROM, EPROM, EEPROM, flash, Static RAM (SRAM), and Dynamic RAM (DRAM).

As shown in FIG. 2B, the storage medium 270 may hold various categories of software and data, such as computer readable program code 277 and/or an operating system 273. The operating system 273 controls operations of an electronic device 100. In particular, the operating system 273 may manage the resources of an electronic device 100 and may coordinate execution of various programs by the processor 250. The computer readable program code 277, when executed by the processor 250, may cause the processor 250 to perform any of the operations illustrated in the flowcharts of FIGS. 3-6, below.

With the above as context for the present application, it has been recognized that not all environments 145 are suitable for collection of images 130 and/or points 140-144 for later construction of the 3D model. Rather, there are various criteria that may be used to determine whether an environment is suitable or unsuitable for performing a 3D scan. For example, environments 145 with light levels that are too low, too high, or too inconsistent will result in the capturing of images that are either too dark, too bright, or have too much contrast between them. Additionally, problems in generating the 3D model may result if a low degree of loop closure in the images 130. Briefly, loop closure involves detection by an algorithm or device that data within a new image 130 partially or completely matches data within a previous image 130. As discussed above, in some embodiments the user 110 may capture images 130 around 360 degrees (or, alternatively, at least 180 degrees) of the object 135 and of the environment 145. Each of these images 130 may be analyzed and feature points may be found therein. A high percentage of rediscovered feature points in a later image is indicative of an environment 145 in which 3D scanning is likely to be successful, because it is indicative that the algorithm is able to track the movement of the image capture device 240 accurately. Additionally, problems in generating the 3D model may result if a low amount of data in the background of the images 130, as it may be difficult to separate background components in the environment 145 from data representing the 3D object. Each of the above and other scenarios may result in difficulty identifying points (e.g., points 140-144) on the surface of the object 135 and may create downstream problems in the generation of the 3D model.

Figure 3:
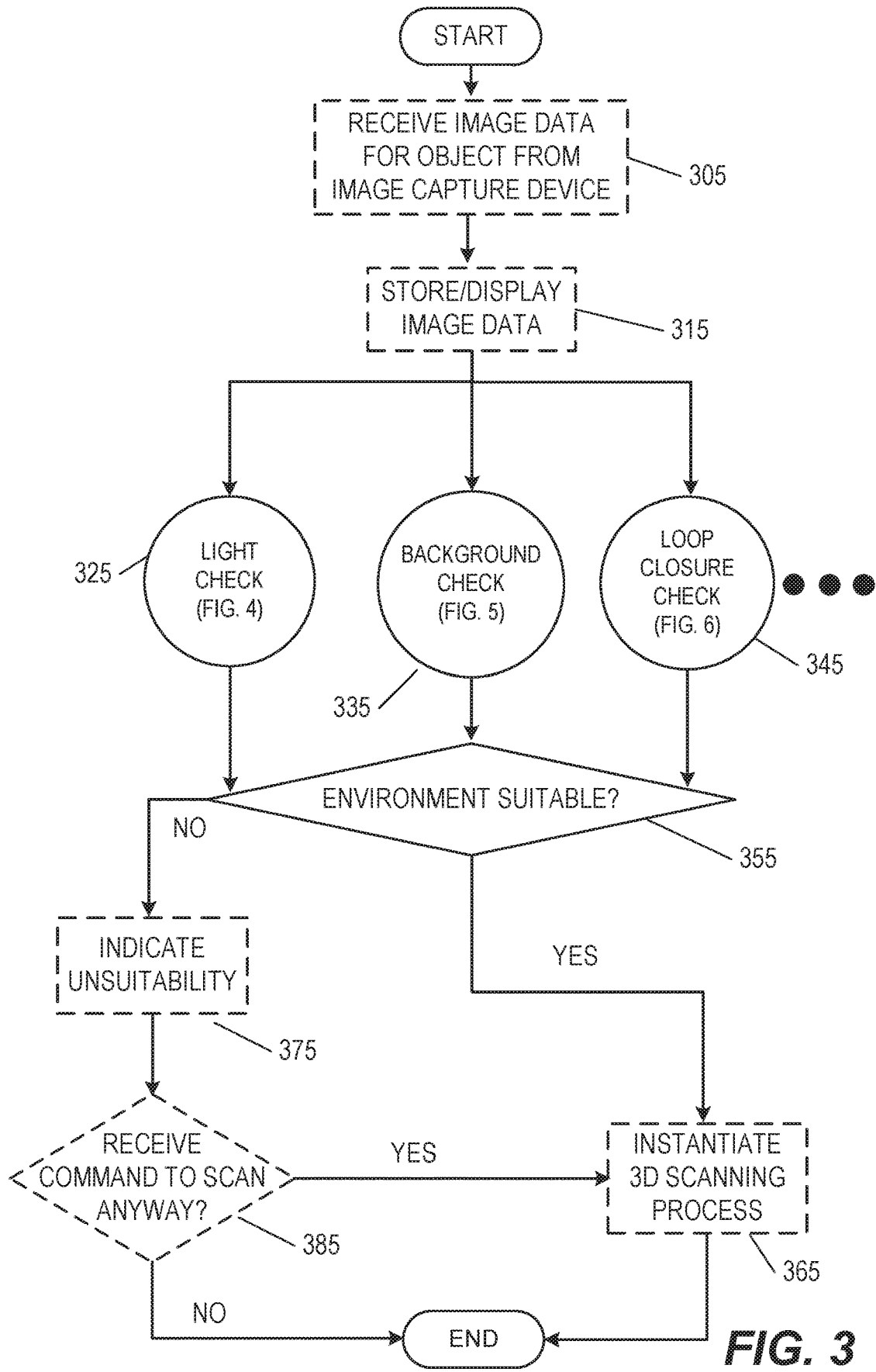
FIG. 3 is a flowchart that illustrates an example method according to the present disclosure.
Figure 4:
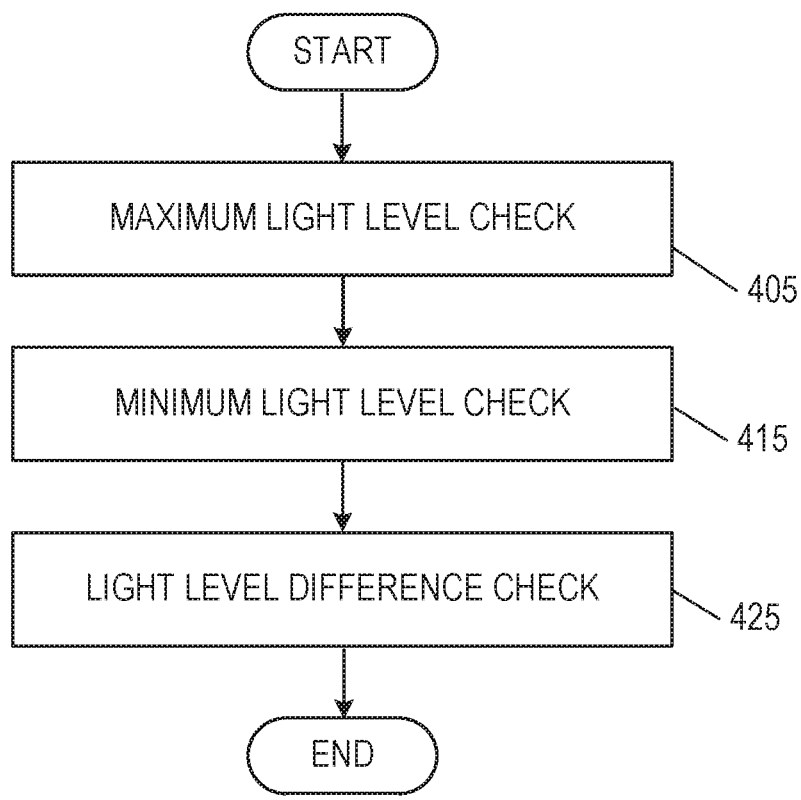
FIG. 4 is a flowchart that illustrates an example method according to the present disclosure, which may be a sub-operation of the method illustrated in the flowchart of FIG. 3.
Figure 5:
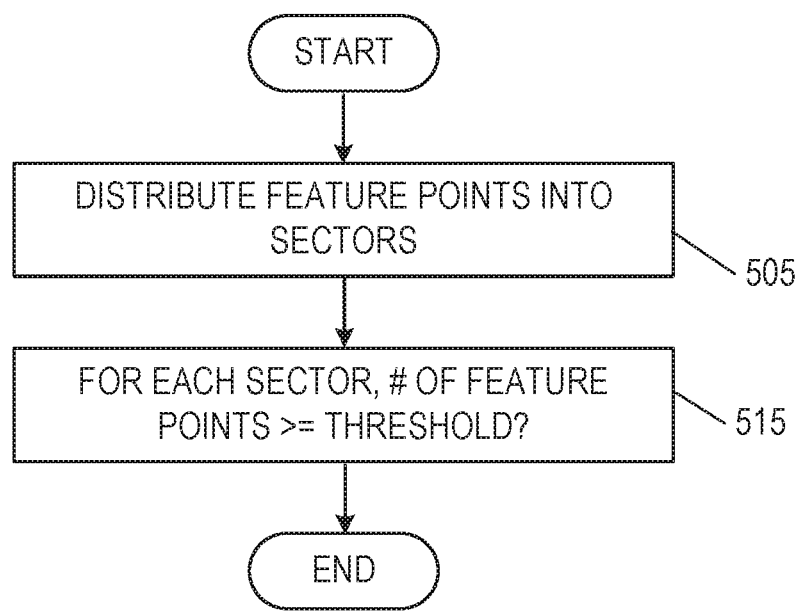
FIG. 5 is a flowchart that illustrates an example method according to the present disclosure, which may be a sub-operation of the method illustrated in the flowchart of FIG. 3.
Figure 6:
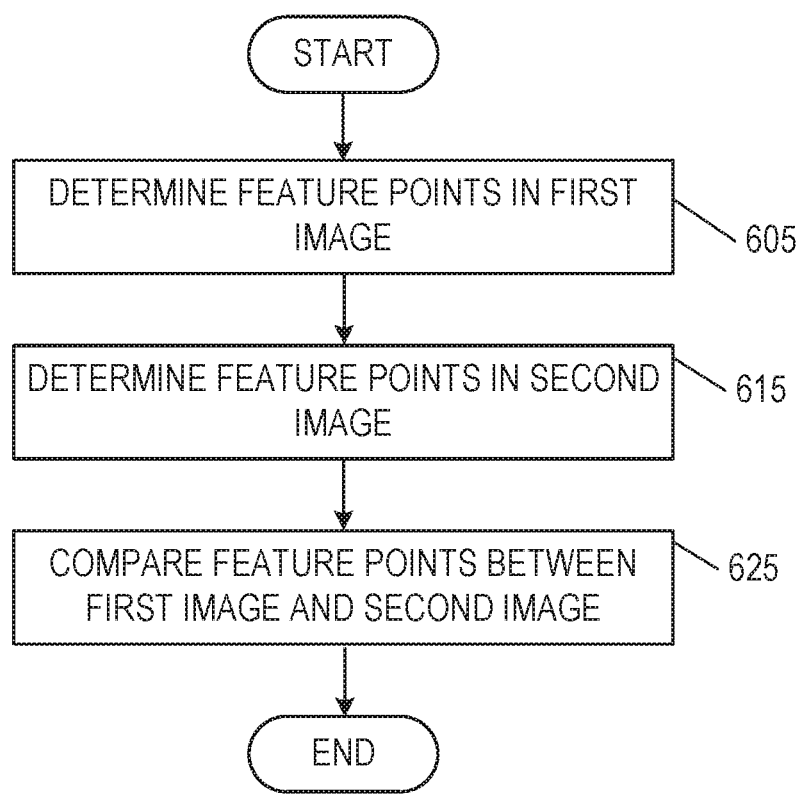
FIG. 6 is a flowchart that illustrates an example method according to the present disclosure, which may be a sub-operation of the method illustrated in the flowchart of FIG. 3.

To address this identified problem, provided herein are operations for determining whether an environment 145 is acceptable or suitable for capturing image data of the environment and an object 135 situated in the environment 145 to perform a 3D scan of the object. For example, FIG. 3 is a flowchart of an operation for determining whether an environment 145 is acceptable or suitable for capturing image data of the environment and an object situated in the environment to perform a 3D scan of the object. FIGS. 4-6 are flowcharts of example sub-operations of the operation of FIG. 3, with each of FIGS. 4-6 illustrating performance of one or more specific example checks of the environment 145 and/or the object 135 to determine whether a condition exists in the environment 145 that renders the environment 145 suitable or unsuitable for capturing the image data. Although an electronic device 100 may be configured to perform any of the operations in the flowcharts of FIGS. 3 to 6, one or more of the operations may, in some embodiments, be performed outside of the electronic device 100.

As an example usage of the provided operations, the user 110 may be directed to perform a preliminary capturing of images 130 around 360 degrees (or, alternatively, at least 180 degrees) of the object 135 and of the environment 145 prior to performance of actual 3D scanning (e.g., the user 110 may navigate around the object 135 in the environment 145 twice, once to determine whether the environment is acceptable and once to perform the actual image capturing). As another example usage of the provided operations, the user 110 may be directed to perform a preliminary capturing of images 130 around 360 degrees (or, alternatively, at least 180 degrees) of the object 135 and of the environment 145 as part of performance of actual 3D scanning, and the captured images may be checked for environment acceptability during the 3D scanning process (e.g., the user 110 may navigate around the object 135 in the environment 145 only once, and the same images are used to determine whether the environment is acceptable and to perform the actual 3D scanning).

Referring to FIG. 3, operations for determining whether an environment is acceptable or suitable for capturing image data of the environment and an object situated in the environment include performing one or more checks (Blocks 325, 335, and/or 345) on captured image data of the environment 145 and/or the object 135 situated in the environment 145. Each check (Block 325, 335, and/or 345) is associated with a respective criteria. If the environment satisfies the respective criteria associated with a check, then the result may indicate that the environment is suitable for performing the 3D scan of the object 135 with respect to that criteria. Conversely, if the environment does not satisfy the respective criteria associated with the check, then the result may indicate that the environment is unsuitable for performing the 3D scan of the object 135 with respect to that criteria. Moreover, the operations may include determining (Block 355) that the environment is suitable (YES branch from Block 355) or unsuitable (NO branch from Block 355) for performing the 3D scan based on the results of the performed one or more checks.

Although FIG. 3 illustrates that the one or more checks can be performed in parallel, it is entirely within the scope of the present disclosure that the one or more checks may be performed sequentially, without regard as to order. In other words, a first check (e.g., Block 325, 335, and/or 345) may be performed substantially simultaneously with, subsequent to, or preceding a second check (e.g., Block 325, 335, and/or 345).

The operations of Blocks 325, 335, 345 and 355 may be performed by an electronic device 100, which may be a smartphone, a tablet computer, a laptop computer, a portable camera, or one of various other portable electronic devices. Alternatively, the operations of Blocks 325, 335, 345 and 355 may be performed by a server, a desktop computer, a fixed camera (e.g., a security camera), or another electronic device that is separate from, and less portable than, the electronic device 100. The electronic device 100 may, in some embodiments, be referred to as a "mobile device" or a "user equipment."

FIG. 4 corresponds to Block 325 of FIG. 3 and illustrates operations for performing example light checks of the environment 145. The checks of FIG. 4 and of Block 325 may use an amount of light or light level as a criterion. For one or more of the captured images 130, an amount of light or light level may be calculated, either based on the captured image, metadata, and/or other data provided by the image capture device 240. A light level value may include one or more of, as examples, light value, exposure value, luminous energy, luminous intensity, luminance, illuminance, and so on. In a first check of the light level of a captured image 130, the light level of the image may be compared to a maximum threshold (Block 405). If the light level of the image exceeds the maximum threshold, for example, it may indicate that the image is too bright and that the corresponding portion of the environment 145 may be difficult to capture successfully. A second check of the light level of a captured image 130 may compare the light level of the image to a minimum threshold (Block 415). If the light level of the image is below the minimum threshold, for example, it may indicate that the image is too dark and that the corresponding portion of the environment 145 may be difficult to capture successfully.

Finally, a third check may determine a difference between the maximum light level across the set of captured images and the minimum light level across the set of images. This difference may be compared to an inconsistency threshold (Block 425). If the difference exceeds the inconsistency threshold, it may indicate that portions of the environment 145 may be difficult to capture successfully.

Although FIG. 4 illustrates that each of the one or more checks may be performed in the order shown, in some embodiments the order may differ (and as with FIG. 3, the checks may be performed sequentially or in parallel). Moreover, while in some embodiments each check may be performed, in other embodiments, an indication during performance of an initial performed check that the environment is unsuitable may result in not performing a subsequent check and proceeding to indicating the unsuitability of the environment 145. This may be beneficial in conserving processing resources, as the environment 145 has been found to be potentially unsuitable for at least one reason.

FIG. 5 corresponds to Block 335 of FIG. 3 and illustrates operations for performing an example background check of the environment 145. The check of FIG. 5 and of Block 335 may use an amount of data in the background of the images 130 as a criterion. As discussed above, a low amount of data in the background of the images 130 may result in problems in generating the 3D model, as it may be difficult to separate background components in the environment 145 from data representing the 3D object. A low amount of background data can make it hard to compute the movement ("pose and position") of the device 240 which is critical to achieve a good 3D model. Unlike some forms of still photography, where a uniform (e.g., monochromatic) background may be desirable, in 3D scanning a background environment with defined features may be more desirable, as it may be useful in determining the feature points of the object 135 and of the environment 145. One example check of the environment 145 may include, for one or more of the captured images 130, determining feature points of the image using one or more feature-point-detecting algorithms, and distributing the detected feature points into sectors or "buckets" (Block 505). In some embodiments, the feature points may be stable feature points, which may include feature points that are discovered in multiple captured images 130. In some embodiments, a predetermined number of sectors/buckets may be used. For example, 72 buckets may be used. In some embodiments, each sector or bucket may correspond with a portion of the captured image 130. These feature points may be distributed for both angles around the horizontal plane and for angles against the horizontal plane. A number of adjacent or neighboring sectors with low feature points may be an indicator of potentially problematic areas.

The operations illustrated in FIG. 5 may then determine, for each sector, whether the number of feature points distributed into the sector meets or exceeds a threshold value. (Block 515). If the number of feature points for a given sector does not meet or exceed the threshold value, it may indicate that a corresponding portion of the environment 145 is unsuitable for 3D scanning. In some embodiments, it may be preferable to have a smaller number of points that are spread out in 3D space as compared with a larger number of points closer together in 3D space, as the background feature points may be obscured by the object 135 being scanned.

FIG. 6 corresponds to Block 345 of FIG. 3 and illustrates operations for performing of an example loop closure check of the environment 145. The check of FIG. 6 and of Block 345 may use a degree of loop closure as a criterion. As discussed above, a low degree of loop closure in the images 130 may result in problems in generating the 3D model. Briefly, loop closure involves detection by an algorithm or device that data within a new image 130 partially or completely matches data within a previous image 130. As discussed above, in some embodiments the user 110 may capture images 130 around 360 degrees (or, alternatively, at least 180 degrees) of the object 135 and of the environment 145. Each of these images 130 may be analyzed and feature points may be found therein. A high percentage of rediscovered feature points in a later image is indicative of an environment 145 in which 3D scanning is likely to be successful, because it is indicative that the algorithm is able to track the movement of the image capture device 240 accurately. In FIG. 6, feature points may be determined for a first image of the captured images 130 using a feature-point-determining algorithm (Block 605). Feature points may also be determined for a second image of the captured images 130 using a second feature-point-determining algorithm (Block 615). The feature points of the first image and the second image may be compared (Block 625). If the number of rediscovered feature points between the first image does not exceed a threshold value, then there may be a problem with the environment 145 (e.g., the environment may be unsuitable for 3D scanning).

Returning to FIG. 3, operations for determining whether an environment 145 is acceptable or suitable for capturing image data of the environment and an object situated in the environment may include various optional operations. For example, after determining (Block 355) that each performed check indicates that the environment 145 is suitable (YES branch from Block 355) or unsuitable (NO branch from Block 355) for performing the 3D scan, the operations may, in some embodiments, include indicating the unsuitability of the environment 145 (Block 375). For example, details resulting from the one or more checks (Blocks 325, 335, and/or 345) may be displayed on a display of a Graphical User Interface (GUI) 290 (FIG. 2A) of the electronic device 100. The details may include a brief indication of the problem (e.g., an inadequate amount of light in the environment) and a potential solution (e.g., an instruction to turn on a light or open a window in the environment). In some embodiments, a specific image indicating a portion of the loop in which a problem occurred may be displayed on the GUI 290. For example, if during a portion of the loop, the image capture device 240 was too close to, or too far away from, the object 135, one or more of the images captured during the too close/too far portion may be displayed on the GUI 290 to enable the user 110 to pinpoint where in the loop an obstacle is, or where greater care is needed.

Operations may also, in some embodiments, include, where at least one of the performed one or more checks indicates the environment 145 is unsuitable (NO branch from Block 355), receiving an override user command (Block 385). After displaying the details resulting from the one or more checks (Blocks 325, 335, and/or 345) on the display of a Graphical User Interface (GUI) 290 (FIG. 2A) of the electronic device 100, the user 110 may decide that a more suitable environment 145 will be difficult or impossible to achieve. As an example, it may be difficult to impede/eliminate a light source because there is no window shade or curtain for the light source, and the object 135 to be scanned cannot be located or moved elsewhere. The user 110 may therefore decide to disregard the indication of unsuitability of the environment 145 and attempt to perform the 3D scanning process regardless. As a result, a command indicating acknowledgement that the environment 145 may be unsuitable and commanding instantiation of the 3D scanning process may be received (Block 385), and the 3D scanning process may be instantiated (YES branch from Block 385). However, in some situations the user may cancel or otherwise terminate the 3D scanning process while improvements to the environment 145 are made (NO branch from Block 385).

Moreover, operations may, in some embodiments, include, if each of the performed one or more checks indicates the environment 145 is suitable (YES branch from Block 355), automatically instantiating the 3D scanning process (Block 365). This may include, for example, preparing and/or commanding the electronic device 100 to perform operations that are part of an image capturing process using the image capture device 240. In some embodiments, this may include displaying on the GUI 290 an indication that the environment is acceptable or suitable for 3D scanning.

Various operations may, in some embodiments, be performed before performing the one or more checks (Blocks 325, 335, and/or 345) on the captured image data of the environment 145. The operations may include receiving (Block 305), in a storage medium 270 (FIG. 2A), image data for the environment 145 from an image capture device 240 (FIG. 2A). In some embodiments, the same electronic device 100 that captures the image data may perform the one or more checks (Block 325, 335, and/or 345) of the environment 145 based on the image data. Alternatively, one device may capture the image data and a different device may perform the one or more checks (Block 325, 335, and/or 345) of the environment 145 based on the image data. Moreover, operations may include storing/displaying image data (Block 315) in the same electronic device 100 that captured the image data, or receiving the image data from another device via a network interface 260 (FIG. 2A). In some embodiments, the image data may refer to photos or to frames from a video stream. The checks (Block 325, 335, and/or 345) of the environment 145 may be used regardless of how the input data/images were captured.

Specific example embodiments of the present inventive concepts are described with reference to the accompanying drawings. The present inventive concepts may, however, be embodied in a variety of different forms and should not be construed as limited to the embodiments set forth herein. Rather, these embodiments are provided so that this disclosure will be thorough and complete and will fully convey the scope of the present inventive concepts to those skilled in the art. In the drawings, like designations refer to like elements. It will be understood that when an element is referred to as being "connected," "coupled," or "responsive" to another element, it can be directly connected, coupled or responsive to the other element or intervening elements may be present. Furthermore, "connected," "coupled," or "responsive" as used herein may include wirelessly connected, coupled, or responsive.

The terminology used herein is for the purpose of describing particular embodiments only and is not intended to be limiting of the present inventive concepts. As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will also be understood that although the terms "first" and "second" may be used herein to describe various elements, these elements should not be limited by these terms. These terms are only used to distinguish one element from another element. Thus, a first element could be termed a second element, and similarly, a second element may be termed a first element without departing from the teachings of the present inventive concepts.

Example embodiments of the present inventive concepts may be embodied as nodes, devices, apparatuses, and methods. Accordingly, example embodiments of the present inventive concepts may be embodied in hardware and/or in software (including firmware, resident software, microcode, etc.). Furthermore, example embodiments of the present inventive concepts may take the form of a computer program product comprising a non-transitory computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Example embodiments of the present inventive concepts are described herein with reference to flowchart and/or block diagram illustrations. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the functions specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

In the specification, various embodiments of the present inventive concepts have been disclosed and, although specific terms are employed, they are used in a generic and descriptive sense only and not for purposes of limitation. Those skilled in the art will readily appreciate that many modifications are possible for the disclosed embodiments without materially departing from the teachings and advantages of the present inventive concepts. The present inventive concepts are defined by the following claims, with equivalents of the claims to be included therein.

What is claimed is:

1. A method of checking an environment for performing a three-dimensional (3D) scan, the method comprising:
    performing one or more checks on captured image data of the environment, wherein performing each of the one or more checks comprises determining whether the environment satisfies a respective criterion, wherein a first check of the one or more checks uses loop closure as a criterion and wherein performing the first check comprises performing a loop closure check; and
    determining that the environment is suitable or unsuitable for performing the 3D scan based on a result of each performed check, wherein determining that the environment is suitable for performing the 3D scan comprises determining that the environment satisfies each of the respective criteria of the performed one or more checks, and wherein determining that the environment is unsuitable for performing the 3D scan comprises determining that the environment does not satisfy at least one criterion of the performed one or more checks.

2. The method of claim 1, wherein a second check of the one or more checks uses light level as a criterion and wherein performing the second check comprises comparing a first light level of the captured image data to a first threshold.

3. The method of claim 2, wherein a third check of the one or more checks uses light level as a criterion and wherein performing the third check comprises comparing of a second light level the captured image data to a second threshold.

4. The method of claim 3, wherein a fourth check of the one or more checks uses light level as a criterion and wherein performing the fourth check comprises comparing a third threshold to a difference between a first light level of the captured image data and a second light level of the captured image data.

5. The method of claim 4, wherein a fifth check of the one or more checks uses background data as a criterion and wherein performing the fifth check comprises performing a background check comprising:
    determining a plurality of feature points in the captured image data;
    distributing the plurality of feature points into one or more sectors; and
    determining whether a number of the plurality of feature points for adjacent sectors of the one or more sectors exceeds a threshold value.

6. The method of claim 1, further comprising:
    receiving, in a storage medium, the captured image data from an image capture device.

7. The method of claim 1, wherein the determining comprises determining that the environment is suitable for performing the 3D scan; and
    instantiating performance of a 3D scanning process.

8. The method of claim 1, wherein the determining comprises determining that the environment is unsuitable for performing the 3D scan; and wherein the method further comprises:
    indicating to a user that the environment is unsuitable for performance of the 3D scan.

9. The method of claim 8, further comprising:
    receiving a user command indicating acknowledgement of the indication that the environment is unsuitable for performance and commanding instantiation of a 3D scanning process.

10. An electronic device comprising:
    a processor; and
    a storage device that is coupled to the processor and comprising computer readable program code therein that when executed by the processor causes the processor to perform the method of claim 1.

11. A computer program product comprising:
    a non-transitory computer readable storage medium comprising computer readable program code therein that when executed by a processor causes the processor to perform the method of claim 1.

12. A computer program product comprising:
    a non-transitory computer readable storage medium comprising computer readable program code therein that when executed by a processor causes the processor to perform operations comprising:
        performing one or more checks on captured image data of an environment, wherein performing each of the one or more checks comprises determining whether the environment satisfies a respective criterion, wherein a first check of the one or more checks uses loop closure as a criterion and wherein performing the first check comprises performing a loop closure check; and
        determining that the environment is suitable or unsuitable for performing a 3D scan based on a result of each performed check, wherein determining that the environment is suitable for performing the 3D scan comprises determining that the environment satisfies each of the respective criteria of the performed one or more checks, and wherein determining that the environment is unsuitable for performing the 3D scan comprises determining that the environment does not satisfy at least one criterion of the performed one or more checks.

13. The computer program product of claim 12, wherein the computer readable program code further causes the processor to perform at least one of:
    a comparison of a first light level of the captured image data to a first threshold;

a comparison of a second light level the captured image data to a second threshold; and/or a comparison of a third threshold to a difference between the first light level of the captured image data and the second light level of the captured image data.

14. The computer program product of claim 12, wherein the computer readable program code further causes the processor to perform a background detail check.

15. An electronic device comprising:
a processor; and
a storage device that is coupled to the processor and comprises computer readable program code therein that when executed by the processor causes the processor to perform operations comprising:
    performing one or more checks on captured image data of an environment, wherein performing each of the one or more checks comprises determining whether the environment satisfies a respective criterion, wherein a first check of the one or more checks uses loop closure as a criterion and wherein performing the first check comprises performing a loop closure check; and
    determining that the environment is suitable or unsuitable for performing a 3D scan based on a result of each performed check, wherein determining that the environment is suitable for performing the 3D scan comprises determining that the environment satisfies each of the respective criteria of the performed one or more checks, and wherein determining that the environment is unsuitable for performing the 3D scan comprises determining that the environment does not satisfy at least one criterion of the performed one or more checks.

16. The electronic device of claim 15, wherein the computer readable program code further causes the processor to perform at least one of:
    a comparison of a first light level of the captured image data to a first threshold;
    a comparison of a second light level the captured image data to a second threshold; and/or
    a comparison of a third threshold to a difference between the first light level of the captured image data and the second light level of the captured image data.

17. The electronic device of claim 15, wherein the computer readable program code further causes the processor to perform operations comprising:
    determining a plurality of feature points in the captured image data;
    distributing the plurality of feature points into one or more sectors; and
    determining whether a number of the plurality of feature points for adjacent sectors of the one or more sectors exceeds a threshold value.

* * * * *